United States Patent
Cox, Jr. et al.

(10) Patent No.: US 8,826,058 B1
(45) Date of Patent: Sep. 2, 2014

(54) DELAY TOLERANT ASYNCHRONOUS INTERFACE (DANI)

(71) Applicants: Jerome R. Cox, Jr., Sunset Hills, MO (US); George Engel, Maryville, IL (US); James Moscola, Red Lion, PA (US); Thomas J. Chaney, Bridgeton, MO (US)

(72) Inventors: Jerome R. Cox, Jr., Sunset Hills, MO (US); George Engel, Maryville, IL (US); James Moscola, Red Lion, PA (US); Thomas J. Chaney, Bridgeton, MO (US)

(73) Assignee: Blendics, Inc., St. Louis, MO (US)

( * ) Notice: Subject to any disclaimer, the term of this patent is extended or adjusted under 35 U.S.C. 154(b) by 0 days.

(21) Appl. No.: 14/025,677

(22) Filed: Sep. 12, 2013

Related U.S. Application Data

(60) Provisional application No. 61/701,704, filed on Sep. 16, 2012.

(51) Int. Cl.
*G06F 1/04* (2006.01)
*G06F 1/10* (2006.01)
*G06F 1/12* (2006.01)
*G06F 5/06* (2006.01)
*G06F 15/78* (2006.01)

(52) U.S. Cl.
CPC .. *G06F 1/12* (2013.01); *G06F 5/06* (2013.01); *G06F 15/7825* (2013.01)
USPC ............................ 713/400; 713/401; 713/600

(58) Field of Classification Search
CPC ....... G06F 1/10; G06F 1/324; G06F 13/1652; G06F 13/1663; G06F 13/1673; G06F 13/1689; G06F 15/7825; G06F 5/06
See application file for complete search history.

(56) References Cited

U.S. PATENT DOCUMENTS

| | | | | |
|---|---|---|---|---|
| 6,850,092 | B2 * | 2/2005 | Chelcea et al. | 326/93 |
| 7,310,396 | B1 * | 12/2007 | Sabih | 375/354 |
| 8,559,576 | B2 | 10/2013 | Ono et al. | |
| 2007/0097771 | A1 * | 5/2007 | Chu et al. | 365/221 |
| 2009/0019193 | A1 * | 1/2009 | Luk | 710/52 |
| 2009/0323876 | A1 * | 12/2009 | Ono et al. | 375/354 |

OTHER PUBLICATIONS

Quinton et al., "Practical Asynchronous Interconnect Network Design," IEEE Transactions on Very Large Scale Integration (VLSI) Systems, May 2008, pp. 579-588, vol. 16, No. 5, IEEE, New York, NY.

Santosh Sood, "A Novel Interleaved and Distributed FIFO," Thesis, Nov. 2005, The University of British Columbia, Vancouver, BC, CA (115 pages).

* cited by examiner

*Primary Examiner* — Dennis M Butler
(74) *Attorney, Agent, or Firm* — The Law Office of Kirk D. Williams

(57) ABSTRACT

A Delay-tolerant Asynchronous Interface (DANI) is typically used to make the clock domains for reusable silicon intellectual property (IP) cores completely independent of each other. In fact, a DANI-wrapped IP core usually appears to its environment as if it were clockless. This property is necessary to address the variability in data transmission-time between source and destination. This variability is a result of increased lack of predictability in today's leading-edge manufacturing processes. A DANI wrapper can be applied to the IP core that is the source of data to be transmitted or it can be applied to the IP core that is the destination of that data. The transmission time over the route between source and destination may vary more than a single clock period.

24 Claims, 9 Drawing Sheets

DELAY TOLERANT ASYNCHRONOUS INTERFACE (DANI)

CROSS-REFERENCE TO RELATED APPLICATIONS

This application claims the benefit of U.S. Provisional Application No. 61/701,704, filed Sep. 16, 2012, which is hereby incorporated by reference in its entirety.

TECHNICAL FIELD

The present disclosure relates generally to the design of computer and communication systems; and in particular, but not limited to, delay-tolerant asynchronous interfaces that provide a reliable communications interface between systems, such as, but not limited to synchronous cores on an integrated circuit chip.

BACKGROUND

The semiconductor industry continues to decrease the minimum feature-size of transistors and thereby increase the density of transistors on an integrated circuit (IC). Today, billion-transistor circuits are being produced and much higher densities are forecast for the years to come. However, it has become increasingly difficult to meet timing constraints throughout an integrated circuit that has but a single clock domain. A globally-asynchronous, locally-synchronous (GALS) approach has been gaining in popularity to overcome this difficult architectural problem. The GALS approach is to partition a system design into decoupled clock-independent modules that can be designed to meet their individual requirements. These independent modules can then be coupled using an asynchronous interconnect network or an asynchronous network-on-chip (ANoC), which improves reliability by simplifying clock-domain crossing timing by using delay-tolerant connection modules. However, the complexity of such interconnect networks (measured in terms of the number of different ways control signals traverse such an interconnect network) grows exponentially instead of linearly as the number of independent control network elements used in implementing the interconnect network is increased. Therefore, providing a reliable interconnect network becomes problematic without a methodology to control this increased complexity.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
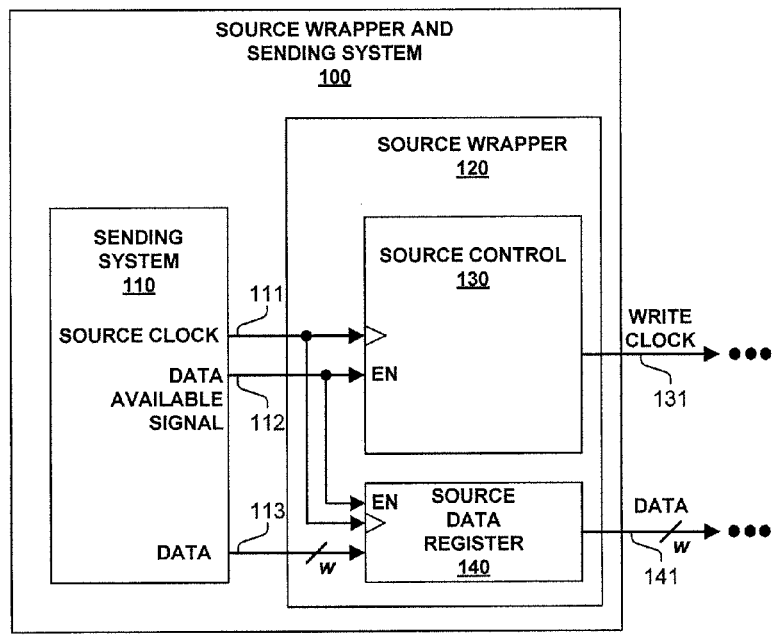
FIG. 1A illustrates a sending system according to one embodiment.

Disclosed are, inter alia, methods, apparatus, computer-storage media, mechanisms, and means associated with a delay-tolerant asynchronous interface. One embodiment includes an integrated circuit, comprising: a source wrapper providing an asynchronous sending interface to a sending system on the integrated circuit, with the asynchronous sending interface producing a write clock output signal and a data output signal; a destination wrapper providing an asynchronous receiving interface to a receiving system on the integrated circuit, with the asynchronous receiving interface receiving a write clock input signal and a data input signal; and signal paths on the integrated circuit communicatively coupling the write clock output signal and the write clock input signal, and the data output signal and the data input signal, with the signal paths providing said received write clock input and data input signals with a relative timing said produced between said write clock output and data output signals.

In one embodiment, the destination wrapper includes an asynchronous first-in, first-out queue (aFIFO) providing an intermediate storage of information received on the data input signal lines from a first clock domain with timing corresponding to the write clock input signal and provided to the receiving system operating in a different clock domain that is timed by a read clock received from the receiving system. In one embodiment, the destination wrapper uses a unary code, not a Gray code, to determine locations within the aFIFO. In one embodiment, the destination wrapper produces token-based flow control information provided to the source wrapper over a flow control signal path for controlling sending of information from the source wrapper to the destination wrapper. In one embodiment, each of the sending and receiving systems is synchronous.

2. Description

A Delay-tolerant Asynchronous Interface (DANI) is typically used to make the clock domains for reusable silicon intellectual property (IP) cores completely independent of each other. In fact, a DANI-wrapped IP core usually appears to its environment as if it were clockless. This property is necessary to address the variability in data transmission-time between source and destination. This variability is a result of the lack of predictability of the properties of transistors and their interconnections in today's leading-edge, integrated-circuit manufacturing processes. The term "asynchronous" is used in referring to the wrappers because they provide a non-synchronous interface between sending and receiving systems. One embodiment employs dual clocking of components in the asynchronous interfaces.

A DANI wrapper is applied to the IP core that is the source of data to be transmitted or it can be applied to the IP core that is the destination of that data. The transmission time over the route between source and destination may vary, both within and among integrated circuits and be more than a single clock period in duration. The source of data may be synchronous and the destination for that data may also be synchronous, but may be operating at a different clock frequency and/or phase. However, this invention also applies if the source, destination or both have an irregular clock and/or are asynchronous.

There are many possible embodiments of a DANI. Note, the term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. Also, typically same figure numbers used in different figures typically refer to the same thing in each figure; and typically the last two digits of a three-digit reference number correspond to a same thing but in different embodiments.

One embodiment is expressed as a hierarchical set of block diagrams. At the top level there are two alternative cases:

DANI without flow control. A wrapper for the destination IP core that can be used when the source clock frequency is never greater than the destination clock frequency. A trivial wrapper for the source may also be included.

DANI with flow control. Wrappers applied to both source and destination IP cores that can be used no matter the relationship between source and destination clock frequencies.

Section 1 reviews the case without flow control. The flow-control case in Section 2 then requires only a few additional ideas. Section 3 reviews some synchronization issues. Section 4 discusses some practical issues related to signal integrity. Section 5 reminds the reader of the vast number of embodiments of the teachings described herein.

1. DANI without Flow Control.

Figure 1B:
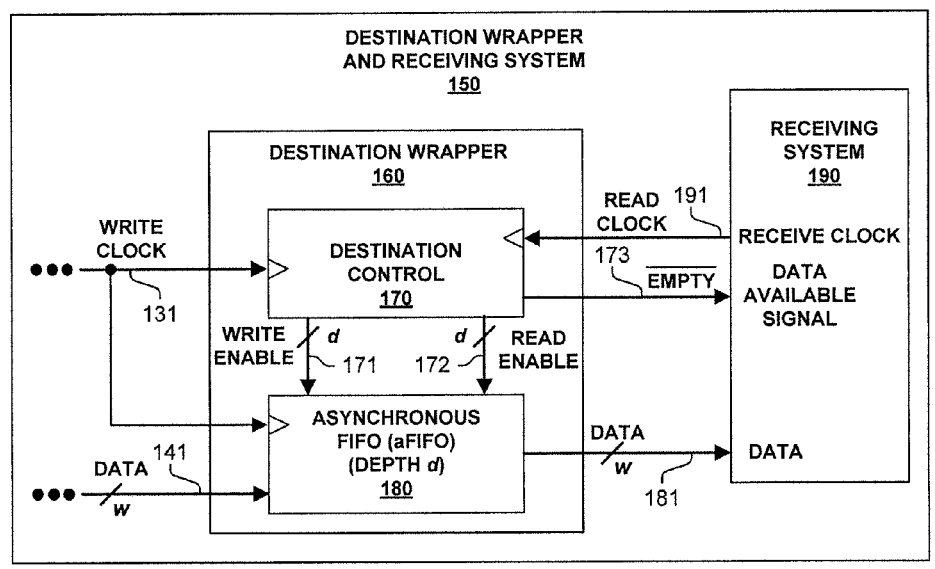
FIG. 1B illustrates a receiving system according to one embodiment.

FIG. 1A illustrates a source wrapper and sending system 100 of a first clocked domain according to one embodiment. FIG. 1B illustrates a destination wrapper and receiving system 150 of a second clock domain according to one embodiment. One embodiment communicatively couples write clock signal 131 and w data lines 141 of FIGS. 1A and 1B to provide a reliable interface between two independently clocked domains. This design problem is called "clock domain crossing" and is a notoriously difficult task. Conventional solutions compromise either reliability or efficiency.

Specifically referring to FIG. 1A, sending system 110 produces the three signals of data 113 (w-bits wide), a free-running source clock 111, and a data available signal 112, reporting that information is being communicated over data 113. Source wrapper 120 receives these signals. Source control 130 converts source clock 111 and data available 112 to a gated write clock 131 signal for transmission to the destination (e.g., destination wrapper 160 of FIG. 1B). Source wrapper 120 also includes a w-bit wide source data register 140 that drives the w-bit wide data bus 141 to the destination (e.g., destination wrapper 160 of FIG. 1B). This arrangement insures that data transitions and the escorting-clock transitions have a well-defined phase relationship at the source. If setup, hold, and clock-to-Q times were zero, then setting clock transitions to take place exactly one-half clock period after data transitions allows for the largest maximum skew constraint and insures that the clock and data transitions arrive at the destination in a timely way. An actual case typically will require a somewhat smaller maximum skew constraint.

There are several source-synchronous write clock 131 embodiments, such as, but not limited to those using two-phase or four-phase clocking, etc. Typically, signal integrity issues will dictate which of them should be used for a particular integrated circuit. Two-phase embodiments transmit the clock at half the frequency of source clock 111, either on one or two wires. These two-phase embodiments are more complicated at the destination than four-phase. Therefore, we delay their discussion until Section 4 and assume here the four-phase option that sets write clock 131 equal in frequency to source clock 111.

Destination wrapper and receiving system 150 of FIG. 1B includes destination wrapper 160 and receiving system 190 of one embodiment. Receiving system 190 generates a read clock 191 for synchronizing the receiving data 181 into the clock domain of receiving system 190.

Destination control 170 of destination wrapper 160 provides, based on write clock 131, enabling signals (read enable 172 and write enable 171) for reading and writing the appropriate w-bit wide register of an asynchronous FIFO 180 (aFIFO) of depth d (meaning it can store d different words of w-bits wide). The source-synchronous write clock 131 drives the writing process at the aFIFO 180 while the destination's read clock 191 drives the reading process. The $\overline{empty}$ signal 173 indicates that the aFIFO 180 is not empty and there are data words available to be read. The write enable 171 and read enable 172 signals are d-bit wide pointers that indicate the appropriate aFIFO 180 registers for writing and reading, respectively. Words can be concurrently written to and read from the aFIFO 180 without interference so long as the two pointers differ (e.g., they are concurrently accessing different registers). This is the case so long as $\overline{empty}$ 173 is asserted and the aFIFO 180 does not overflow, a condition that can never occur if the destination clock is at least as fast as the source clock. Destination control 170 and the aFIFO 180 make up the DANI wrapper at the destination, which provides $\overline{empty}$ signal 173 (as a data available signal) and the w-bit wide data 181 from the entry of aFIFO 180 selected by read enable signal 172.

One embodiment includes multiple instances of the source control 130 and source data register 140 within the source wrapper 120. Similarly, one embodiment includes multiple instances of the destination control 170 and the aFIFO 180 within the destination wrapper.

Figure 2:
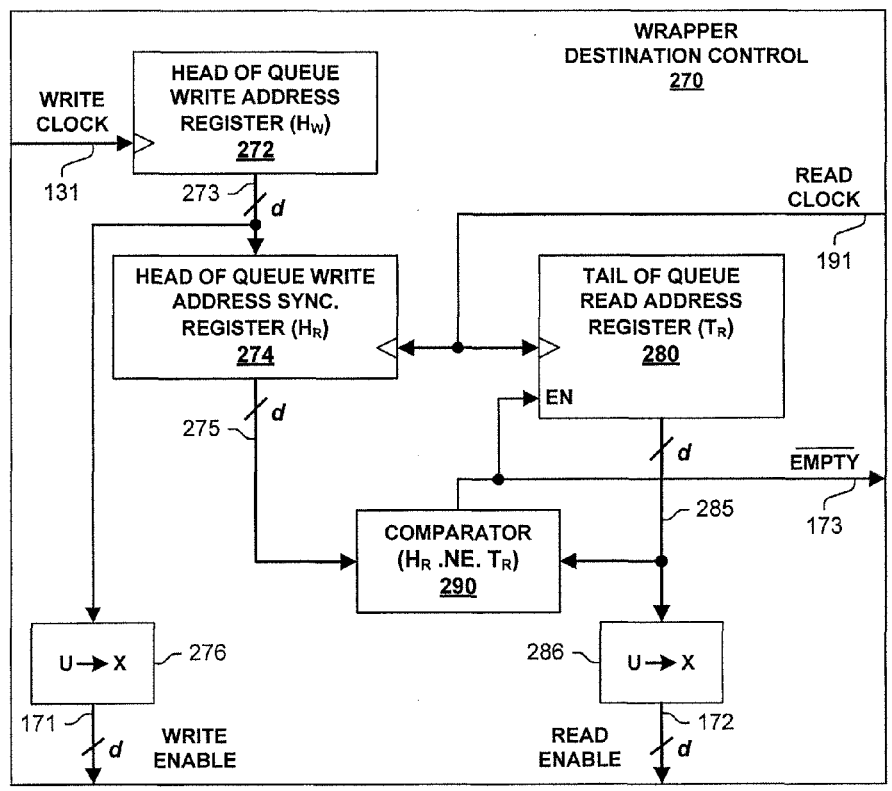
FIG. 2 illustrates a wrapper destination control according to one embodiment.

FIG. 2 illustrates one embodiment of a DANI wrapper destination control 270 for generating signals for controlling the timing of communications operations to ensure reliability. As shown, DANI wrapper destination control 270 includes the head of queue write address register ($H_W$) 272 and the tail of queue read address register ($T_R$) 280. These write and read address registers record, in coded form, the position of the next aFIFO register to be written and the next aFIFO register to be read, respectively (e.g., to or from aFIFO 180 of FIG. 1B). The former is written on the write clock 131 (e.g., from source control 130 of FIG. 1A) and the latter on the read clock 191 (e.g., from receiving system 190 of FIG. 1B). In order to determine if the aFIFO is empty, the write and read address registers are compared. However, $H_W$ register 272 and $T_R$ register 280 must be synchronized first because they are advanced on different clocks—e.g., from the source (write) domain (denoted by subscript "W") and the destination (read) domain (denoted by subscript "R").

This synchronization is done in $H_R$ register 274 receiving $H_W$ signal 273 so that the synchronized write register output 275 and read register output 285 can be compared by comparator 290 in the domain of the read clock (191). When $H_R$ 275 and $T_R$ 285 are different, data 181 (from aFIFO 180 of FIG. 1B) are available and the aFIFO 180 is not empty. Comparator 290 generates the appropriate $\overline{\text{empty}}$ 173 signal. Conversion from the coding scheme used in $H_W$ 272 and $T_R$ 280 to the decoded pointers, write enable 171 and read enable 172 is carried out by the two U→X decoding blocks 276 and 286.

Figure 3A:
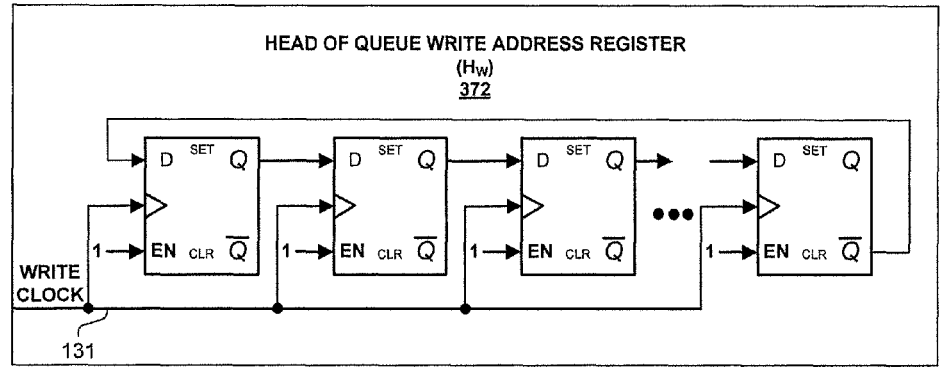
FIG. 3A illustrates a head of queue write address unit according to one embodiment.
Figure 3B:
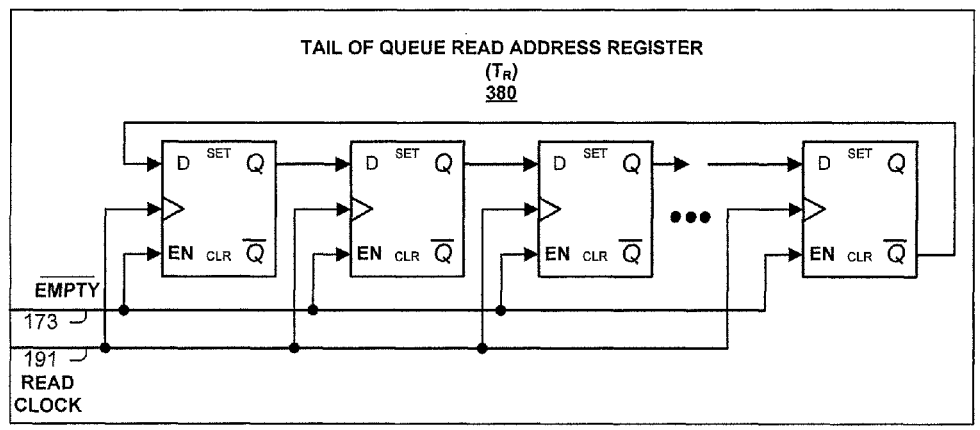
FIG. 3B illustrates a tail of queue read address unit according to one embodiment.

Shown in FIG. 3A is Head register $H_W$ 372 and shown in FIG. 3B is Tail register $T_R$ 380 used in one embodiment to synchronize communications between two independently clocked domains. The Head register $H_W$ 372 is composed of a shift register with d flip-flops (e.g., typically corresponding to the maximum number of entries that can be stored in an aFIFO 180 of FIG. 1B). The first d−1 shift-register flip-flops, $FF_1, FF_2, \ldots FF_{d-1}$, shift their Q outputs to the D input to the right. $FF_d$ shifts its $\overline{Q}$ output back to the D input of $FF_1$. Thus, for example for d=4 and starting with the register initialized to all zeros we have the sequence:

0000→1000→1100→1110→1111→0111→0011→
0001→0000

This sequence is a unary code that is fixed in length and repeats cyclically, stepping forward on each rising edge of write clock 131. Note that $H_W$ 372 contains a code for which a transition from 1 to 0 or from 0 to 1 in the example sequence of four bits identifies a unique aFIFO location that is used to construct a four-bit address pointer. This rule applies except for the 1111 and 0000 cases when the right-most bit is the pointer. In one embodiment, a gray code, lookup table, and/or other sequence generator is used instead of the unary code described supra.

This particular, fixed-length unary code has the property that only one bit changes at each step in the sequence and can be easily generalized to any number of bits d. The property of the code wherein only a single-bit changes on each rising edge of the write clock facilitates the synchronization that takes place in $H_R$ 274.

Referring to FIG. 2, on each rising edge of read clock 191 all the bits of $H_W$ 272 (which is $H_W$ 372 of one embodiment) are copied to $H_R$ 274, a register synchronized to the receive clock (e.g., read clock 191). This synchronization step assumes that a single read clock cycle allows sufficient settling time to achieve the desired mean time between failures (MTBF). However, if an increased MTBF is required, added clock cycles can be inserted to increase the effective settling time. Alternative such schemes are described in Section 3. It is important to recall that only one bit of $H_W$ 372 of FIG. 3A changes at a time in one embodiment. It does not matter if a transition is missed because the next clock will catch it. However, if the changing bit of $H_W$ 372 remains metastable throughout the allowed settling-time, a synchronization failure may occur.

Referring to FIG. 3B, tail register $T_R$ 380 is like $H_W$ 372 (of FIG. 3A), except it steps on read clock 191 and has an active enable signal instead of being fixed high. $T_R$ 380 uses the same d-bit unary code, as do $H_W$ 372 and $H_R$ 274 (of FIG. 2). When the aFIFO 180 (of FIG. 1B) is empty, the codes in $H_R$ 274 and $T_R$ 380 are identical and both synchronized to read clock 191 so that the $\overline{\text{empty}}$ signal 173 (of FIG. 2) is false (e.g. empty is true). When the codes in $H_R$ 274 and $T_R$ 280 are not identical they can be compared and a $\overline{\text{empty}}$ signal 173 generated. This $\overline{\text{empty}}$ signal 173 is used to enable the $T_R$ register 380 so that it does not move ahead in its cycle unless the aFIFO 180 has data to be read. The U→X decoder 276 and 286 (of FIG. 2) takes the codes used in the $H_R$ 274 and $T_R$ 380 registers and decodes them by converting to a "one-hot" code suitable for enabling a single register in the aFIFO 480. One embodiment uses the conversion defined by the following equations:

$$X_i = U_i \oplus U_{i+1}; i=1,2,\ldots d-1$$

$$X_d = U_d \oplus \overline{U}_1; i=d-1$$

An example conversion from U→X for d=4 is
0000→0001, 1000→1000, 1100→0100, 1110→0010,
1111→0001, 0111→1000, 0011→0100, 0001→0010.

$H_W$ register 372 (of FIG. 3A) shifts on every rising edge of write clock 131. The details of the $T_R$ register 380 (of FIG. 3B) are similar except that it shifts on the rising edge of read clock 191 unless the $\overline{\text{empty}}$ signal 173 is not asserted.

Figure 4:
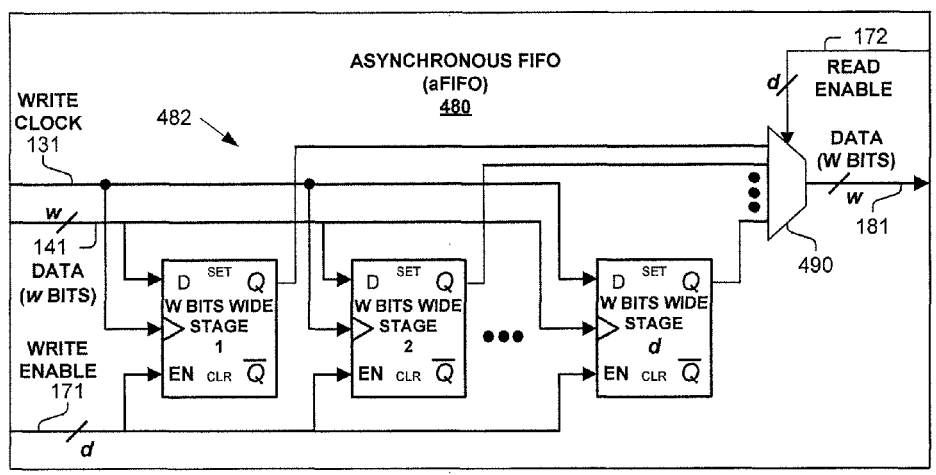
FIG. 4 illustrates an asynchronous first-in, first-out queue (FIFO) according to one embodiment.

Shown in FIG. 4 is an aFIFO 480 used in one embodiment. As shown, aFIFO 480 uses d registers, each w-bits wide. When w-wide data (141) are transmitted on the rising edge of write clock 131, only one of the d registers is write-enabled as determined by the d-bit write enable signal 171. The Q outputs of all the registers 482 are multiplexed (490) together and only the register selected by the d-bit read enable signal 172 is presented as output w-bit wide data 181.

If care is not taken in laying out an integrated circuit, the temporal relationship among the w-bit data lines 141 input to the destination wrapper 160 may be overly skewed. Similarly, the temporal relationship between the write clock 131 and these data line 141 may also be overly skewed. Too much skew in any of these relationships may lead to setup or hold violations at the inputs to the d registers of aFIFO 480. These violations may, in turn, lead to data errors. Design tools generally use synchronous timing constraints that utilize absolute values of time measured with respect to the root of the clock tree. These constraints are ineffective in controlling the skew in data and clock signals input to destination wrapper 160. However, relative timing constraints applied, in one embodiment, at the destination wrapper 160 between the data lines 141 and the write clock 131 can minimize this skew. Application of said relative constrains can yield reliable performance of the resulting integrated circuit. In one embodiment satisfaction of these relative constraints is accomplished by iteratively rerouting problem paths until static timing analysis determines that skew is within acceptable limits.

2. DANI with Flow Control.

Figure 5A:
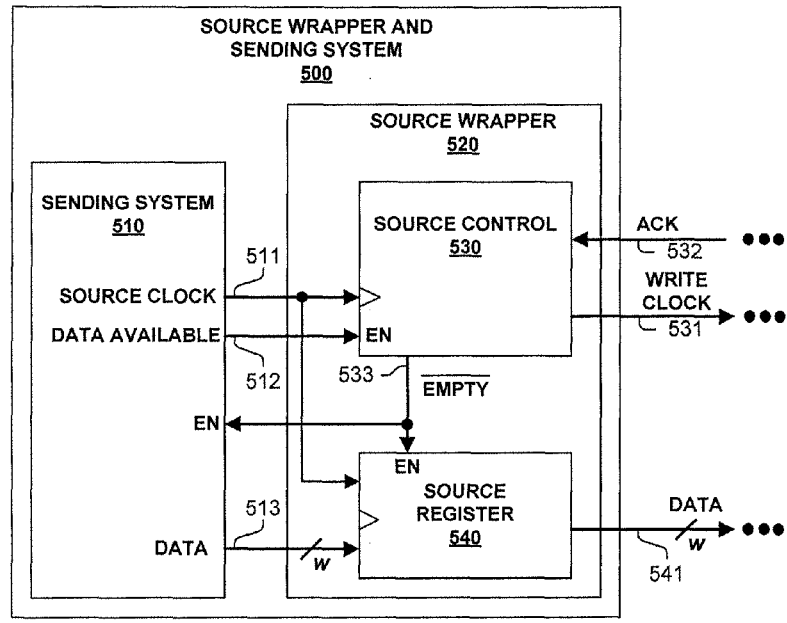
FIG. 5A illustrates a sending system according to one embodiment.
Figure 5B:
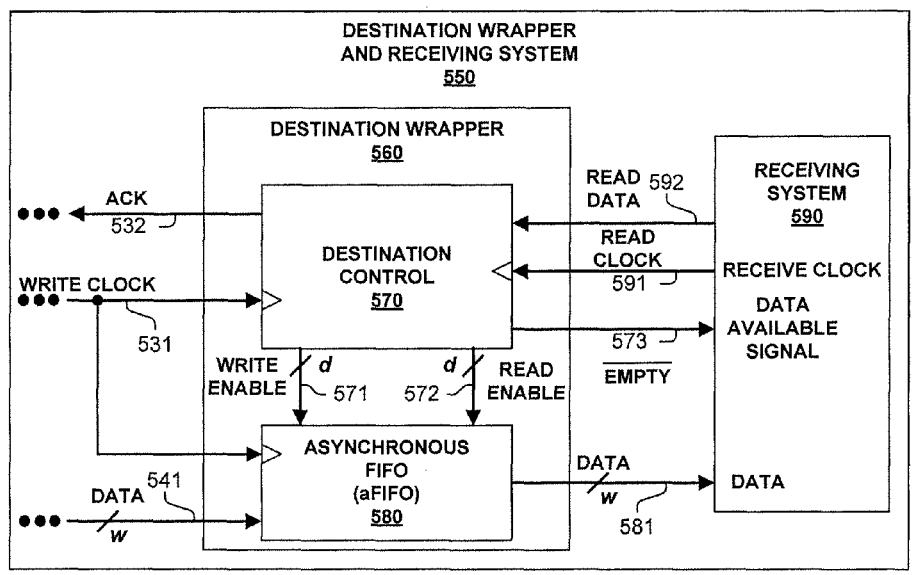
FIG. 5B illustrates a receiving system according to one embodiment.

FIGS. 5A-B show a top-level diagram of one embodiment with flow control added to the circuits of FIG. 1A-B. An acknowledgement token (ACK) 532 is generated whenever the destination 590 (FIG. 5B) reads a word from aFIFO 580. Source control 530 (FIG. 5A) keeps track of these ACK tokens and only allows data to be transmitted when the destination aFIFO 580 has room for it. Data words 581 (FIG. 5B) are read at the destination when the aFIFO is $\overline{\text{empty}}$ 573 and read data 592 is asserted. Otherwise, the action at this top level of one embodiment of FIGS. 5A and 5B is the same as one embodiment without flow control of FIGS. 1A and 1B (typically when the last two digits of a reference number appears in two figures, they refer to the same thing but possibly in a different embodiment).

Figure 6:
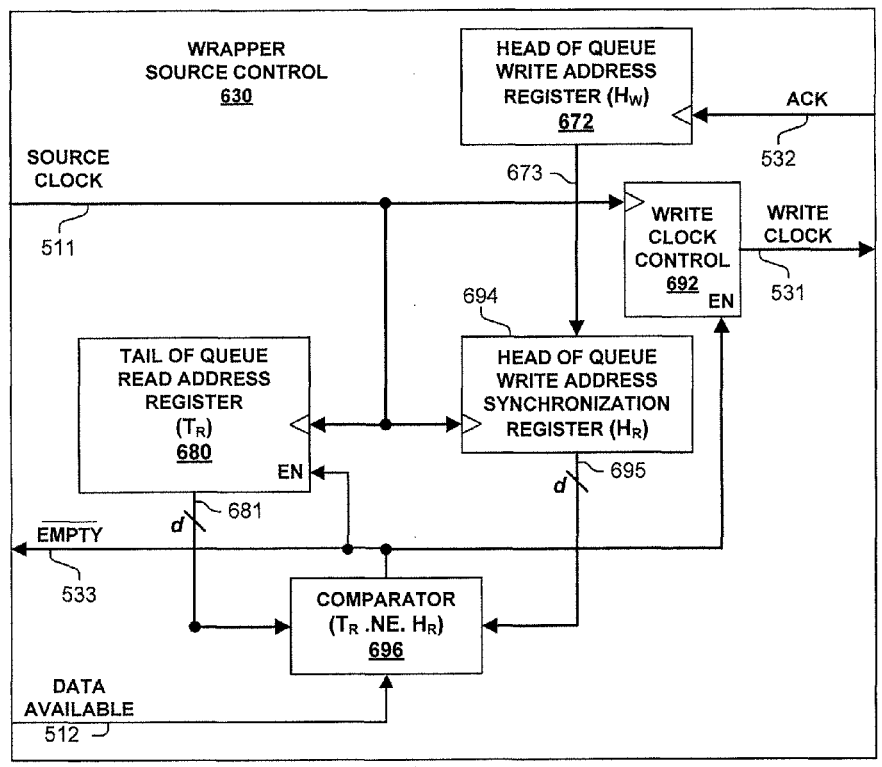
FIG. 6 illustrates a wrapper source control according to one embodiment.

The details of one embodiment 630 of source control 530 of FIG. 5A are shown in FIG. 6, where most of the elements are mirror images of those in the wrapper destination control 270 (of FIG. 2) without flow control. However, in the source control there is no need to compute the write nor read enable. A write clock control block 692 is added similar to that shown in the source control 130 (of FIG. 1A). In the embodiment of FIG. 6, however, write control block 692 converts the free-running source clock 511 and $\overline{\text{empty}}$ signal 533 to a gated write clock 531 for transmission to the destination. As shown in FIG. 5A, only when $\overline{\text{empty}}$ 533 is asserted are data words 541 delivered by the source wrapper 520 to the data bus and sending system 510 is enabled to send data (513) to source wrapper 520.

One embodiment with flow control includes multiple instances of the source control 530, the source data register 540, the destination control 570 and the aFIFO 580 within the source and destination wrappers 520 and 560.

Figure 7:
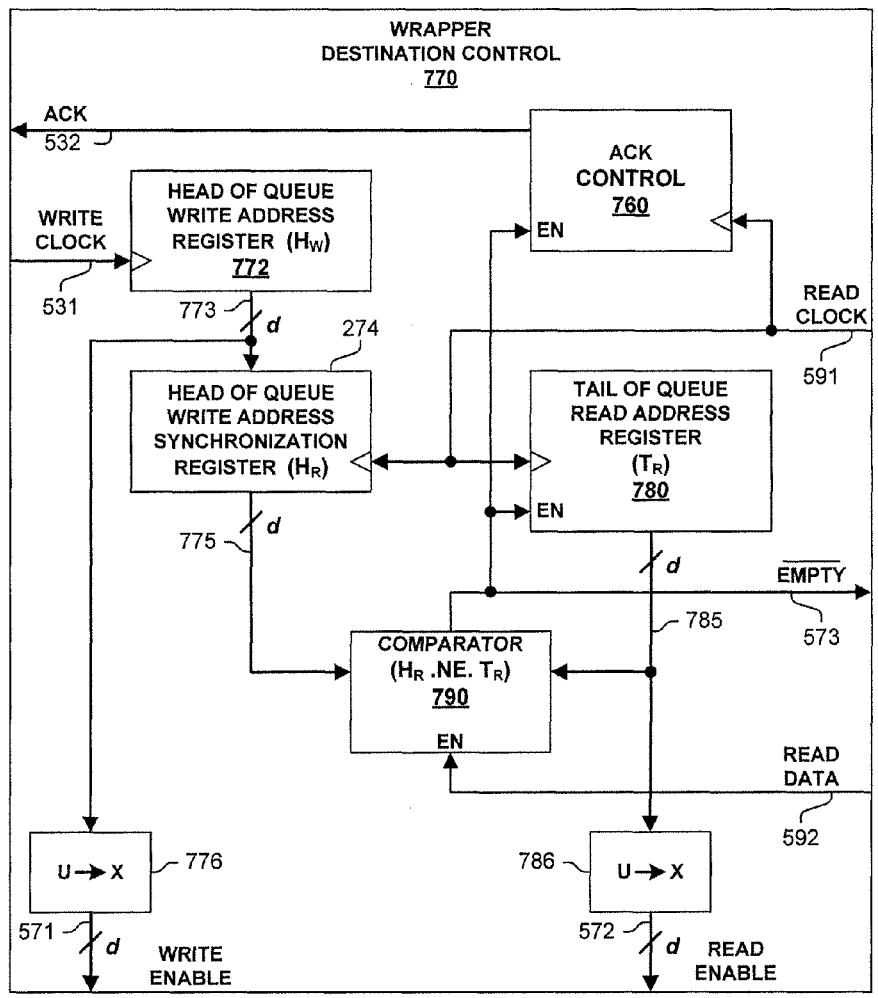
FIG. 7 illustrates a wrapper destination control according to one embodiment.

The destination control design of FIG. 7 is almost identical to that in FIG. 2 (typically when the last two digits of a reference number appears in two figures, they refer to the same thing but possibly in a different one embodiment). One embodiment of wrapper destination control 770 (of FIG. 7) also includes ACK Control 760 at the upper right that block functions similarly to source control 130 of FIG. 1A. Thus, whenever a data word 581 (FIG. 5B) is read by destination synchronization system (FIG. 5B), an ACK token 532 is returned to the source control 530 (FIG. 5A). These tokens are indicated in the source control 530 (FIG. 5A) by the relative positions of the source $H_R$ and $T_R$ registers 680 and 690 of FIG. 6. Tokens are also associated with each data word 541 (FIG. 5A) transmitted by the source wrapper 520. It can be shown that only d tokens are contained in the system (500 of FIG. 5A coupled to 550 of FIG. 5B) so that the depth d of the aFIFO 580 (FIG. 5B) is always sufficient to store the data words transmitted by source wrapper 520 (FIG. 5A). The synchronization process at the source is identical to that at the destination. As a result, the phase and period of the source and destination clocks can be independent of each other.

Figure 8:
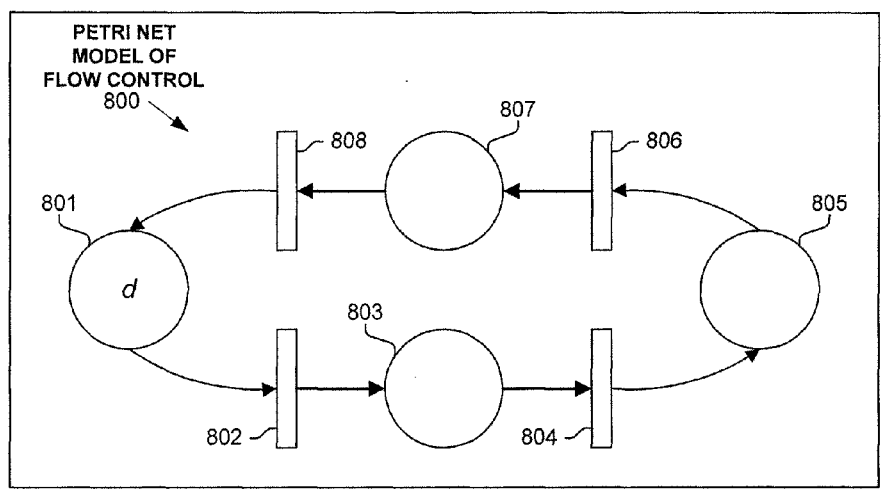
FIG. 8 illustrates a token-based flow control according to one embodiment.

This method of flow control of one embodiment can be understood from examination of the Petri net 800 shown in FIG. 8. At initialization there are d tokens in the place 801 (small circle) at left that models the contents of the d-bit $T_R$ register in the source control 530 (FIG. 5A). The transition 802 (vertical bar) models the launching of a w-wide data word 541 from source wrapper 520. Each time this transition 802 fires, a token is removed from the left-hand place 801 and inserted in the lower-middle place 803 to indicate a data word in flight on the bus from source wrapper 520 (FIG. 5A) to destination wrapper 560 (FIG. 5B). On average there can be no more than d/2 words in flight on this route at a time. When a data word 541 arrives at the destination, the Petri net models that event by the firing of the lower-right transition 804, removing a token from the bus place 803 and adding a token to the right-hand place 805. This corresponds to latching the arriving data word 541 into the aFIFO 580 (FIG. 5B). Only when the destination system 590 reads a word 581 from aFIFO 580 of destination wrapper 560 does the upper-right transition 806 fire representing the launch of an ACK 532 in flight from destination control 570 (FIG. 5B) to source wrapper 520 (FIG. 5A). Finally, the firing of the upper left transition 808 restocks the tokens in the left-hand place 801 indicating that aFIFO 580 has freed up a w-bit wide entry so it can accept new data 541 from source wrapper 520 (FIG. 5A)

The system conserves the number of tokens in the Petri net. As a result there can never be more than d tokens in the right hand place modeling the number of data words in the destination aFIFO 580 of destination wrapper 560 (FIG. 5B). This insures that the aFIFO 580 can never overflow despite variations in delays en route and the timing of the consumption of words by the destination system 590 (e.g., IP core). This is an essential property of the flow control system of one embodiment because it avoids the need to calculate a full signal at the aFIFO 580, a tricky business at best and impossible to do on a timely basis.

The Petri net initial condition of d tokens in the left-hand place 801 of FIG. 8 corresponds to initializing the $T_R$ register 680 and $H_R$ register 694 (FIG. 6) to all 1's and all 0's, respectively in the wrapper source control 630 of FIG. 6. As a result, d data words can be sent by the source wrapper 520 (FIG. 5A) before $T_R$ register 680 and $H_R$ register 694 are both all 0s. The $\overline{\text{empty}}$ signal 533 of source wrapper 520 is then de-asserted curtailing the transmissions.

One embodiment, such as that modeled by the Petri Net 800 of FIG. 8, shows one source and one destination. One embodiment has one or more sources and one or more destinations. One embodiment includes one or more intermediate router modules to direct the flow of data words. In one embodiment, these router modules are synchronous. In one embodiment, these router modules are asynchronous. In one embodiment, point-to-point routes include a DANI wrapper at the destination. In one embodiment, not all point-to-point routes include a DANI wrapper. In one embodiment, typically not using flow control, a single source broadcasts to multiple destinations. Similarly, in one embodiment, a router that implements an asynchronous data branch uses a DANI wrapper. In one embodiment, a router that implements an asynchronous data branch does not use a DANI wrapper. A DANI wrapper may include multiple source and destination interfaces.

3. Improving Mean Time Between Failures (MTBF).

The logic 290 in FIG. 2 that computes $H_R \ne T_R$ determines $\overline{\text{empty}}$ 173, signals that a data word 181 is available at the output of the aFIFO 180 of destination wrapper 160 of FIG. 1B and enables the advancement of $T_R$ 280 on the next read clock 191. However, metastability in $H_R$ 274 can produce erroneous results for $\overline{\text{empty}}$ 173. The time $t_S$ available for $H_R$ 274 to settle is $t_S = t_R - t_L - t_{SU}$, where $t_R$ is the clock period of read clock 191, $t_L$ is the logic delay (290) in computing $\overline{\text{empty}}$ 173 and $t_{SU}$ is the worst case setup time for the registers that use $\overline{\text{empty}}$ 173. Thus, the mean time between failures (MTBF) is $$MTBF = \frac{\exp\left(\frac{t_S}{\tau}\right)}{T_W f_W f_R}$$

where $\tau$ is the settling time-constant of the flip-flops in $H_R$ 274, $T_W$ is their metastability window, $f_W$ is the frequency of write clock (131) transitions and $f_R$ is the read clock (191) frequency.

In order to maximize the MTBF when the parameters and clock frequencies for the circuit are fixed, the available settling time $t_S$ is made as large as possible. This time is compromised by both $t_L$ and $t_{SU}$. The logic delay $t_L$ through the $H_R \ne T_R$ block 290 is at best equivalent to two gates in an ASIC or a single LUT in an FPGA. The logic family used will fix the setup time $t_{SU}$. As a result, one embodiment may not achieve an adequate MTBF with the design shown in FIG. 2.

Figure 9A:
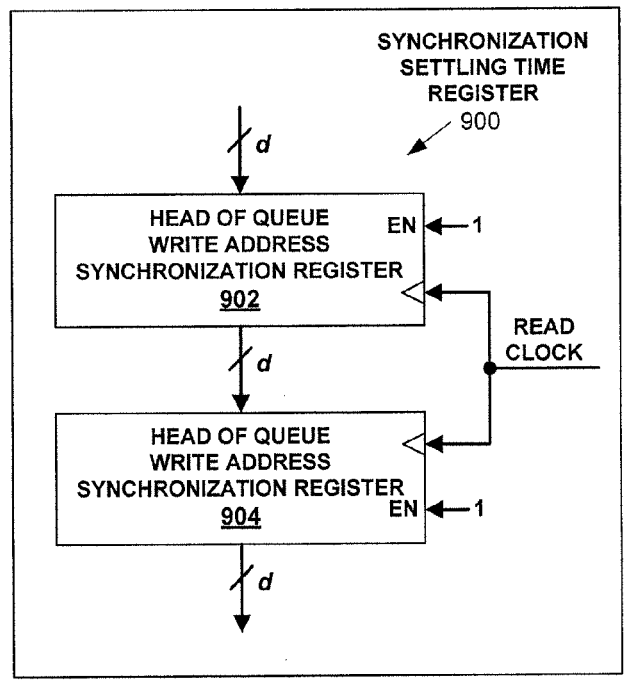
FIG. 9A illustrates a an additional stage synchronization unit according to one embodiment.
Figure 9B:
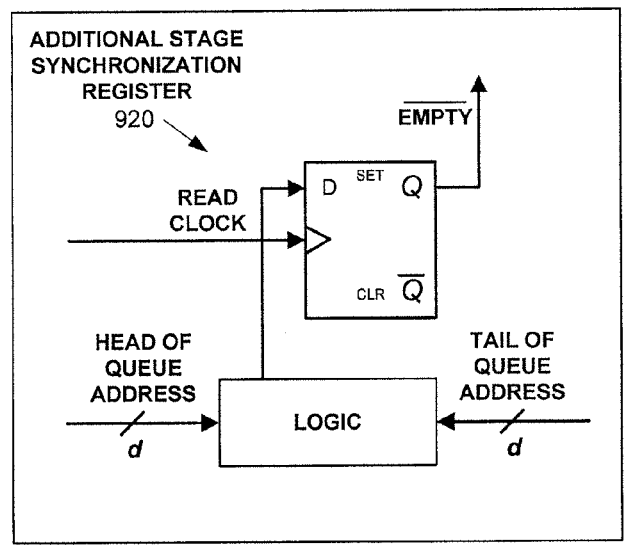
FIG. 9B illustrates an additional stage synchronization unit according to one embodiment.

Two embodiments for additional synchronization settling-time are shown in FIGS. 9A-B. Each shown embodiment 900, 920 introduces an additional stage and an additional clock period of delay in the availability of the $\overline{\text{empty}}$ signal 173 (FIG. 2). This additional stage increases the latency of arrival of data words by one clock tick and dramatically enhances MTBF. Which of the two provides the largest increase in MTBF will depend on circuit parameters and can be determined by simulation.

Embodiment 900 is a familiar two-stage synchronizer 900 instantiated for each of the d bits in $H_R$ 274 (FIG. 2). It replaces the $H_R$ block 274 in FIG. 2. The MTBF is much larger because of a larger $t_S$ and a smaller $T_W$. In fact, $t_S=2t_R-t_L-t_{SU}$, an increase of $t_R$ over the single stage case. The smaller value of $T_W$ and the value of $\tau$ have to be determined from simulation using specific circuit parameters. However, these changes are small compared to the effect of the increase in the value of the exponent.

In embodiment 920 of FIG. 9B, the extra stage of synchronization follows the logic used to calculate inequality between $H_R$ 274 and $T_R$ 280. The value of $t_S$ is unchanged from that of FIG. 9A, but the values of $T_W$ and $\tau$ may be different. Simulation is used to determine their values in one embodiment. If additional settling time is required, a synchronizer with more than two stages may be used in either embodiment 900 of FIG. 9A or embodiment 920 of FIG. 9B.

It might seem that the indeterminacy resulting from marginal triggering of the flip-flop in embodiment 920 of FIG. 9B could lead to an erroneous output 173 stating that the aFIFO 180 (FIG. 1B) had data available when in fact it was empty. If this were true, it would negate the advantage in MTBF because the extra clock period of settling time would not be available. However, such a circumstance cannot occur because transitions from data available to empty only occur as a result of advancing the $T_R$ register 280 (FIG. 2), an action that does not produce metastability. Only advancement of the $H_W$ register 272 (FIG. 2) can produce metastability and the resulting indeterminacy is benign.

Which design is best will depend on circuit parameters. However, embodiment 920 of FIG. 9B requires only one additional flip-flop, whereas embodiment 900 of FIG. 9A requires d extra flip-flops. For example, when d=4 the embodiment 920 of FIG. 9B requires only one additional flip-flop while the embodiment 900 of FIG. 9A requires four. For typical bus widths such that w>>d, the increase of d flip-flops for embodiment 900 of FIG. 9A is only a small fractional increase in required resources.

Note, this analysis discussed supra applies to other embodiments, such as that of wrapper destination control 770, including logic 790, of FIG. 7; wrapper destination control 270, including logic 290, of FIG. 2; and wrapper source control, including logic 696, of FIG. 6.

4. Signal Integrity Issues.

The write clock line 131 and data bus 141 (of FIGS. 2A-B, with this analysis applying to other one embodiments of FIGS. 5A-B) may travel over a substantial portion of the integrated circuit as indicated by the ellipsis in the lines. Transitions on data bus 141 occur at the frequency of rising edges of the clock. However, transitions on write clock line 131 occur at twice that frequency and as a result may be subject to threats to signal integrity, particularly for long runs. It is desirable that write clock line 131 and data bus 141 have the same upper frequency limit.

It is also desirable to have the source wrapper 520 launch the data 541 and the write clock 531 with a well-defined phase relationship to each other. This simplifies the application of relative timing constraints and can be done if all signals are similarly registered at the source wrapper 520. However, registering the data is difficult to do when the clock line must have twice as many transitions as the data lines.

Both of these issues can be addressed by reducing the frequency of write clock 531 to half that of source clock 511. One scheme for accomplishing this frequency division is by including a toggle flip-flop in the source control 530 of FIG. 1. At the destination wrapper 560 it then becomes necessary to shift $H_W$ (in destination control 570) and load the aFIFO registers (580) on both the rising and falling edges of write clock 531. Even numbered bits in $H_W$ and even numbered registers in aFIFO 580 will then have their clock inputs inverted. As a result the depth d of aFIFO 580 must be an even number in one embodiment.

In an alternative scheme, two toggle flip-flops are included at the source control 530 of FIG. 1, one toggling on the rising clock edge and one on the falling edge. The two half-frequency clock lines are transmitted to the destination and, by combining them in an XOR gate, the original clock frequency can be recovered.

These alternative schemes for reducing the transmitted source-synchronous clock frequency have different advantages and disadvantages. The choice between them will depend on individual design considerations.

The write clock 531 and ACK 532 lines shown in FIGS. 5A-B may be gated by data available signal 512 and read data signal 592, respectively. For high clock rates this gating may be problematic and an enable signal escorting these clock lines may be required. This will allow write clock 531 and ACK 532 to be continuously active, but their transitions ignored when the enable signal is not asserted.

A very wide data bus 141 of FIGS. 1A-B and 541 of FIGS. 5A-B may, even with the application of relative timing constraints, have skew that is too large to satisfy the setup and hold constraints at the aFIFO input 180 of FIG. 1B and 580 of FIG. 5B. This problem can be resolved by dividing the bus 141, 541 into a number of smaller busses each of whose skew is tolerable. The skew between busses can then be absorbed by an individual aFIFO on each bus. Only when all portions of a word have been received will the destination core read the entire word.

5. These Ideas can be Broadly Applied.

In view of the many possible embodiments to which the principles of our invention(s) may be applied, it will be appreciated that the embodiments and aspects thereof described herein with respect to the drawings/figures are only illustrative and should not be taken as limiting the scope of the invention(s). The invention(s) as described herein contemplates all such embodiments as may come within the scope of identified claims and equivalents thereof based on this disclosure.

What is claimed is:

1. An integrated circuit, comprising:
   a source wrapper configured to provide an asynchronous sending interface for a sending system on the integrated circuit, with the asynchronous sending interface configured to produce a write clock output signal and one or more data output signals, and configured to receive and react to flow control information;
   a destination wrapper configured to provide an asynchronous receiving interface for a receiving system on the integrated circuit and to produce said flow control information allowing a plurality of data words in flight between the source wrapper and the destination wrapper without an overflow loss in the destination wrapper, with the asynchronous receiving interface configured to receive a write clock input signal and one or more data input signals, wherein the destination wrapper includes an asynchronous first-in, first-out queue (aFIFO) providing an intermediate storage of information received on said data input signals from a first clock domain corresponding to the write clock input signal and provided to the receiving system in a different clock domain corresponding to a read clock received from the receiving system; and
   signal paths on the integrated circuit configured to communicatively couple the write clock output signal with the write clock input signal and said data output signals with said data input signals, and to provide a flow control signal path communicating said flow control information from the destination wrapper to the source wrapper, with said signal paths providing the write clock input signal and said data input signals with relative timing constraints applied between the write clock input signal and said data input signals.

2. The integrated circuit of claim 1, wherein the destination wrapper uses a unary code to specify locations within the aFIFO.

3. The integrated circuit of claim 1, wherein said flow control information includes token-based flow control information.

4. The integrated circuit of claim 1, wherein the aFIFO is configured to store a maximum of d data words; and wherein said flow control information allows for a maximum of d data words to be in flight between the source wrapper and the destination wrapper, wherein d is greater than one.

5. The integrated circuit of claim 1, wherein the sending system and receiving systems are operated on different clocks with one or more different operating clock rates.

6. The integrated circuit of claim 1, wherein said signal paths include no intervening pipeline stages.

7. The integrated circuit of claim 1, wherein the destination wrapper does not use a Gray code to determine locations within the aFIFO.

8. The integrated circuit of claim 1, wherein each of the sending and receiving systems is synchronous.

9. The integrated circuit of claim 1, wherein the source wrapper and destination wrapper are configured to communicate only using said signal paths.

10. The integrated circuit of claim 9, wherein the write clock output signal is a sending system clock gated with a sending system data available signal.

11. The integrated circuit of claim 1, wherein the source wrapper is co-located with the sending system, the destination wrapper is co-located with the receiving system, the destination wrapper is remote from the source wrapper.

12. The integrated circuit of claim 11, wherein the write clock output signal is a sending system clock gated with a sending system data available signal.

13. An integrated circuit, comprising:
a source wrapper providing an asynchronous sending interface for a sending system on the integrated circuit, with the asynchronous sending interface producing a write clock output signal and a data output signal;
a destination wrapper providing an asynchronous receiving interface for a receiving system on the integrated circuit, with the asynchronous receiving interface receiving a write clock input signal and data input signal wherein the destination wrapper includes an asynchronous first-in, first-out queue (aFIFO), and wherein the destination wrapper uses a unary code to specify locations within the aFIFO; and
signal paths on the integrated circuit communicatively coupling the write clock output signal and the write clock input signal, and the data output signal and said data input signal, with the signal paths providing the write clock input signal and said data input signal with relative timing constraints applied between the write clock input signal and said data input signal.

14. A method, comprising:
in response to receiving flow control information identifying that a destination wrapper can accept a plurality of data words, a source wrapper sending to the destination wrapper a plurality of data words such that at least two of the plurality of data words are overlapping in flight between the source and destination wrappers; wherein said sending a particular data word of the plurality of data words includes providing a write clock signal and a w-bits wide data signal, with w being an integer greater than zero;
for each particular data word of the plurality of data words: receiving, by the destination wrapper, the write clock signal and the data signal with relative timing constraints maintained for said sent write clock and data signals; storing, by the destination wrapper, said particular data word communicated in said received data signal in an asynchronous first-in, first-out queue (aFIFO) according to a first clock domain corresponding to said received write clock signal; and receiving, by a receiving system on the integrated circuit, the particular data word from the aFIFO according to a second clock domain according to a read clock signal provided by the receiving system to the destination wrapper.

15. The method of claim 14, comprising receiving, by the source wrapper from a sending system on the integrated circuit, the data word according to the first clock domain according to a write clock signal provided by the sending system to the source wrapper.

16. The method of claim 14, wherein said flow control information is token-based flow control information.

17. The method of claim 14, wherein the receiving system is synchronous.

18. The method of claim 14, wherein the aFIFO is configured to store a maximum of d data words; and wherein said flow control information allows for a maximum of d data words to be in flight to the destination wrapper; wherein d is greater than one.

19. An integrated circuit, comprising:
a receiving system; and
a destination wrapper providing an asynchronous receiving interface for a receiving system on the integrated circuit, with the asynchronous receiving interface configured to receive a write clock input signal and data input signals, with relative timing constraints applied between the write clock input signal and said data input signals, and to generate flow control information to signal to a source wrapper that the source wrapper can send information to the destination wrapper in a manner that allows multiple data words in flight between the source wrapper and the destination wrapper;
wherein the destination wrapper includes an asynchronous first-in, first-out queue (aFIFO) providing an intermediate storage of information received on said data input signals in a first clock domain corresponding to the write clock input signal and provided to the receiving system in a different clock domain corresponding to a read clock received from the receiving system.

20. The integrated circuit of claim 19, wherein said flow control information includes token-based flow control information for controlling sending of information to the destination wrapper.

21. The integrated circuit of claim 19, wherein the aFIFO is configured to store a maximum of d data words; and wherein said flow control information allows for a maximum of d data words to be in flight to the destination wrapper; wherein d is greater than one.

22. The integrated circuit of claim 19, wherein the receiving system is synchronous.

23. An integrated circuit, comprising:
a receiving system; and
a destination wrapper providing an asynchronous receiving interface for a receiving system on the integrated circuit, with the asynchronous receiving interface configured to receive a write clock input signal and data input signal, with relative timing constraints applied between the write clock input signal and said data input signal;

wherein the destination wrapper includes an asynchronous first-in, first-out queue (aFIFO) providing an intermediate storage of information received on said data input signal from a first clock domain corresponding to the write clock input signal and provided to the receiving system in a different clock domain corresponding to a read clock received from the receiving system; and wherein the destination wrapper uses a unary code to specify locations within the aFIFO.

24. The integrated circuit of claim 23, wherein the destination wrapper is configured to produce said flow control information allowing a plurality of data words in flight between a source wrapper of a sending system and the destination wrapper without an overflow loss in the destination wrapper.

* * * * *